Feb. 24, 1959 W. L. ROBERTS ET AL 2,875,349
IMAGE INTENSIFIER
Filed Jan. 20, 1955 2 Sheets-Sheet 1

WITNESSES
Edwin E. Bassler
Wm. B. Sellers.

INVENTORS
William L. Roberts &
John W. Coltman
BY
F. E. Browder
ATTORNEY

United States Patent Office 2,875,349
Patented Feb. 24, 1959

2,875,349

IMAGE INTENSIFIER

William L. Roberts, Turtle Creek, and John W. Coltman, Forest Hills, Pa., assignors to Westinghouse Electric Corporation, East Pittsburgh, Pa., a corporation of Pennsylvania Application January 20, 1955, Serial No. 483,024

11 Claims. (Cl. 250—213)

Our invention relates to image reproducing devices, and in particular relates to a novel device for producing an output field or image which is a replica in space distribution of an input field of a radiation differing from it in intensity and/or kind. Thus, for instance, an input picture of low brightness level may produce on an output screen a picture of greatly amplified brightness.

One object of our invention is to reproduce light images with greatly increased intensity.

Another object is to enable a relatively weak light field to control the space-distribution of a much more intense light field.

Another object is to enable a field of radiation of one kind to control the space distribution of radiation of a different kind.

Another object is to provide a novel arrangement for producing an electron image which is a replica of an image in light or other radiation.

Another object is to provide an arrangement in which, in a single tube, a radiation image can control a space-distributed flow of electrons of much greater amplitude than the radiation itself could generate at any presently-know photoelectrically-emissive surface.

Other objects of our invention will become evident upon reading the following description taken in connection with the drawings in which.

Figure 1:
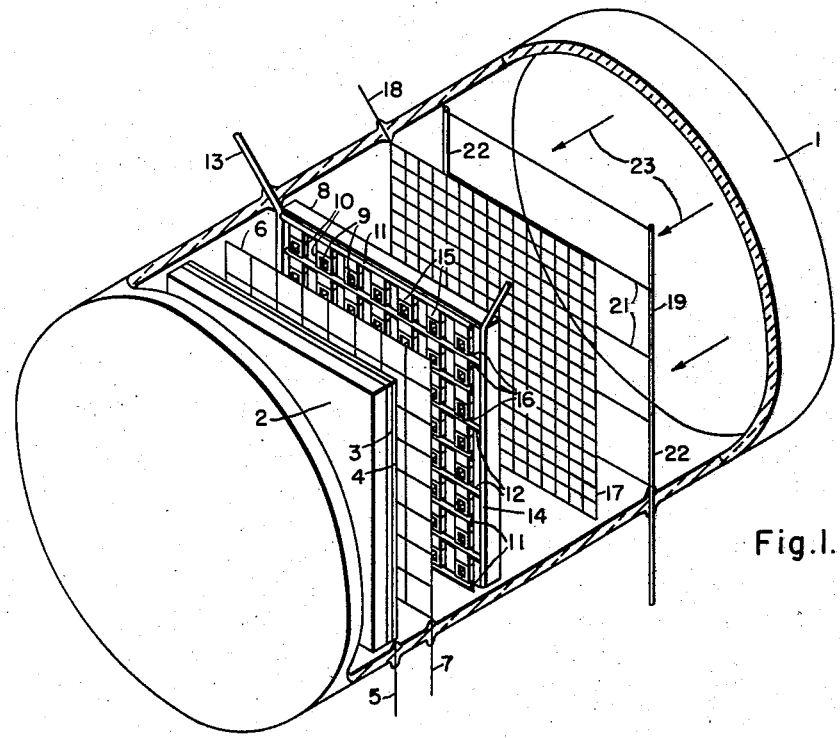
Figure 1 is a schematic view in perspective of light image intensifier tube embodying the principles of our invention.
Figure 2:
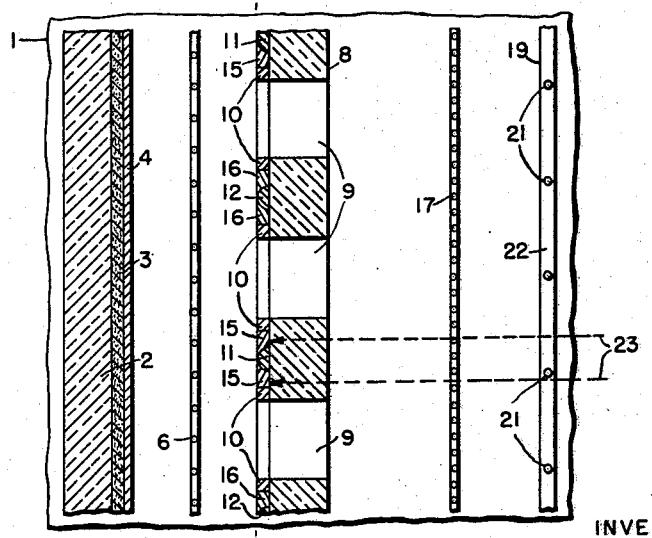
Fig. 2 is a schematic view along an axial section of the tube of Fig. 1.
Figure 3:
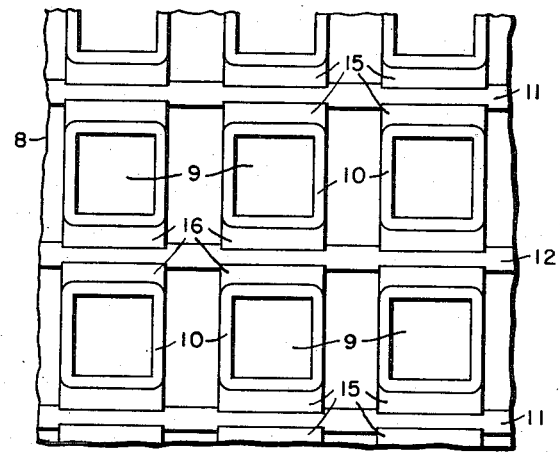
Fig. 3 is a schematic view transverse to the axis of one of the electrodes of the Fig. 1 tube.

Referring in detail to the drawings, the tube of Fig. 1 comprises a cylindrical vacuum-tight container 1, which may be of glass and which for clarity appears with its axial distances exaggerated, having at one end an output screen 2 which may comprise a layer 3 of an electron-sensitive phosphor, such as zinc cadmium sulphide, coated on its interior face with a thin metal coating 4, such as aluminum, connected to an in-lead 5. This screen may, if desired, actually be deposited on the end wall of the vacuum container. Parallel with the output screen 2 is a grid 6 having an in-lead 7, and parallel to grid 6 is an electrode 8 which has many of the characteristics of a control grid and may comprise a plate of insulating material, such as glass, of about the same periphery as output screen 2 and having rows of apertures 9 distributed over its surface. About the edge of each aperture and/or lining it, is a rim 10 of conductive material, such as nickel or aluminum. Between the rows of apertures 9 run alternate conductive strips, all strips 11 being connected to an in-lead 13, and all strips 12 connected to an in-lead 14. One set of these strips, e. g., strip 11, is connected to the rims 10 nearest to it by bridges 15 of photoconductive material, such as thallous sulphide or selenium, while the other set of strips 12 is connected to the rims 10 nearest to it by bridges 16 of some material such as carbon of suitable resistance, as explained below.

Spaced away from the rear face of grid 8 is another grid 17 of fine mesh, having about the same peripheral dimensions as grid 8 and having an in-lead 18. A spatially-extended cathode 19 which is transparent to the radiation being translated and adapted to provide at the adjacent face of grid 17 a stream of electrons relatively uniformly distributed over the face of the latter, and which may comprise a set of parallel emissive-oxide coated wires 21 supplied with heating current from two metallic support-posts 22, is uniformly spaced from grid 17 by a distance of the order of that between wires 21. Any other type of planar cathode which is transparent to the radiation field which is to be reproduced may constitute cathode 19.

To operate as an image intensifier, a radiation field, which may be spatially distributed as an image is projected along the axial direction through cathode 19, grids 17 and 8 onto the photoconductive bridges 15 between the rims 10 and positive strips 11. The resistances of bridges 16 and of bridges 15 are so proportioned that the rims 10, which are intermediate in electrical potential between strips 11 and 12, are at an electrical potential of about —2 volts relative to cathode 19. In-leads 18 are arranged to give grid 17 a potential of about +10 volts; in-lead 7 to give grid 6 a potential of about +50 volts; and in-lead 5 to give output screen 2 a potential of about +15 kilovolts. The grid 6 is made of very fine wires and of such fine mesh that almost none of the intense electric field between it and output screen 2 penetrates into the space between grids 6 and 8.

As long as the photoconductive bridges 15 are not irradiated with radiation 23, none of the electrons attracted toward grid 17 from cathode 19, even though some of them pass through the open meshes in the latter, can pass through the apertures 9 in grid 8 because the rims 10 around said apertures are at a negative potential relative to cathode 19. The wires of grid 17 are made of extremely small diameter so that many electrons do pass through grid 17 to the side between it and grid 8, however. When an image field of radiation 23 is projected onto control-grid 8, the resistances of photoconductive bridges 15 are decreased in correspondence with the local intensity of such radiation at any aperture 9, and the electrical potential of the rim 10 at that point rises toward that of the nearest positive strip 11. Thus, at a point where the radiation field is highly intense, the rims 10 will become most positive, and a copious flow of electrons which have passed from cathode 19 through the openings of grid 17 will pass through the aperture 9, will be attracted by grid 6; will pass through the openings of the latter, and be accelerated to high velocity impact with a corresponding spot on output screen 2 which it will render highly luminous. An axial magnetic field may be provided by means well known in the art to insure that the electrons passing any particular aperture in control-grid 8 are prevented from deviating from a true axial direction before striking output screen 2.

At a point on control-grid 8 where no radiation 23 is incident, the rim 10 around the local aperture 9 will remain at the potential of about —2 volts relative to cathode 19, and no electrons from cathode 19 will be able to pass through the aperture to the side adjacent grid 6 and output screen 2. Hence, no luminous spot will, at that point, appear on the output screen. At other points of the radiation field where the radiation is of some intermediate intensity, the potential of rim 10 about the local aperture 9 will be at a value intermediate between −2 volts and that mentioned in the preceding paragraph, and an intermediate number of electrons will pass the aperture and be accelerated into incidence on output screen 2 to produce a luminous spot of intermediate brightness. There will, thus, be a luminosity distribution over the surface of output screen 2 which corresponds, point-by-point, with the intensity distribution of the input radiation 23. An output-radiation image is thus formed on output screen 2 which is a replica in space distribution of, but may be of greater amplified brightness than, an input radiation image at 23.

The input radiation 23 may be of any kind capable of causing photoconductive response in the bridges 15. For example, it may be light within the visibility range or may be X-rays. By selecting for the output screen 2 a substance which responds to electron impact by emitting radiation other than visible light, a corresponding non-visible radiation output-image may be produced. Thus, an input-image in one radiation type may produce an output-image in radiation of a different kind, with or without an amplification of energy-intensity, by proper choice of the photoconductive bridge material 15 and the output-screen material.

It may be noted that an incident to the production of the radiation-image on output-screen 2 is the production of an electron image which is a replica of the input-radiation image but is of high energy intensity. We may thus consider that we have provided a novel means of causing an input-image in one kind of radiation to generate an electron image which is its replica in space distribution but of greatly amplified energy density.

Electron images which are replicas of radiation images are used in many types of imaging devices, image orthicon type television pick-up tubes being one instance; but the energy density in the electron image is decidedly limited when photoelectric surfaces are used as the source of the electron image. Our arrangement for radiation-generation of electron images may advantageously be substituted for these conventional prior art devices for electron-image generation.

To avoid disturbing effects of potential drop along the cathode filaments 21, it may be desirable to heat them with intense short current pulses delivered during periods in which the potential of one or more of the grids is so adjusted as to cut off the entire electron stream. Alternatively, the input radiation may be removed during this period. For example, when television pictures are being reproduced, these heating-times may coincide with the return-line in picture scanning at the receiver.

Figure 4:
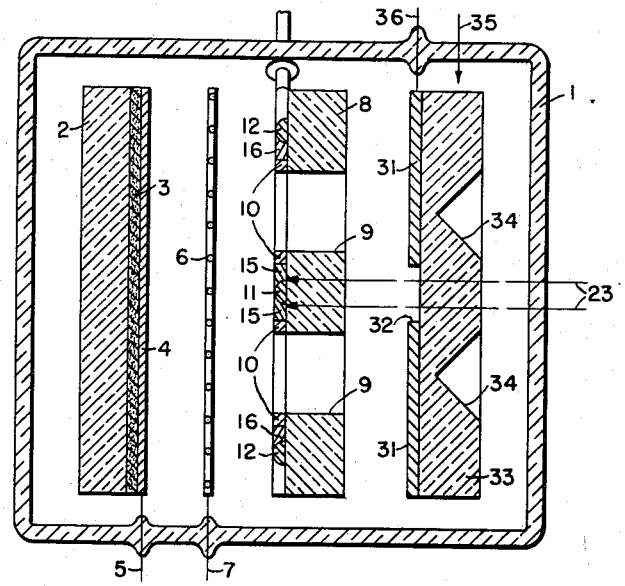
Fig. 4 is a schematic view in axial section of a modification embodying the principles of our invention in a different form than that of Fig. 1.

Fig. 4 shows an alternative form in which the principles of our invention may be embodied, the ratio of the radial dimensions to axial dimensions and the density of apertures in the control electrode being made, for purposes of clarity in illustration, quite different from those actually used in a typical image intensifier. Thus, a cylindrical glass container 1 may have at one end an output-screen 2 like that shown in Fig. 1. The grid 6 and a control-grid 8 are also like those of Fig. 1. However, the electron stream governed by control-grid 8 is produced, not by a thermionically-emissive cathode as in Fig. 1, but by a layer of photoelectrically-emissive material 31 having windows 32 distributed over its surface such as to permit the incident radiation 23 of the image to strike the photoconductive bridges 15. The layer 31 is deposited on one face of a glass plate 33. Aligned with each aperture 9 is a V-shaped depression 34 the bottom of which comprises a pair of intersecting plane surfaces. Radiation 35 of any desired type capable of efficiently exciting electron-emission from the layer 31 is projected edgewise through plate 33, and part of it is reflected by the surface of each depression 34 onto the inner face of layer 31, the latter being thin enough to emit electrons from its outer face. The photoconductive bridges 15 and resistive bridges 16 are, as in Fig. 1, proportioned so that when no radiation 23 is projected through windows 32 onto bridges 15, the rims 10 of apertures 9 in grid 8 are all sufficiently negative in potential relative to in-lead 36 (which is connected to photoelectric layer 31) to prevent electrons passing through apertures 9. When radiation 23 is present, any aperture 9 positioned at a spot where radiation 23 is intense is rendered more positive in the manner described for Fig. 1, and electrons are permitted to flow through it past grid 6 and to be accelerated into violent impact with output-screen 2 where it produces a luminous point. It is believed that the action of the Fig. 4 arrangement needs no further description in view of what has already been stated in connection with Fig. 1.

It should be understood that the term "radiation" is to be construed broadly to cover, for example, a beam of electrons which may be modulated and scan its field, and the expression "photo-conductive material" to cover any semi-insulator which changes conductivity in response to bombardment or incidence of such radiation.

We claim as our invention:

1. In combination in a vacuum-tight container, an electron-emissive cathode, a first grid electrode, a control grid having apertures closely spaced over its face, a conductive rim provided for each of said apertures in said control grid, a resistance element and a photoconductive element provided on said control grid for each said conductive rim, a first conductive means connected through each of said resistive elements to each of said conductive rims, a second conductive means connected through each of said photoconductive elements to each of said conductive rims and an output-screen comprising a material which emits radiation when struck by electrons.

2. In combination in a vacuum-tight container, an electron-emissive cathode, a first grid electrode, a control grid having apertures closely spaced over its face, a conductive rim provided for each of said apertures in said control grid, a resistance element and a photoconductive element provided on said control grid for each of said conductive rims, a first conductive means connected through each of said resistive elements to each of said conductive rims, a second conductive means connected through each of said photoconductive elements to each of said conductive rims, an output-screen comprising a material which emits radiation when struck by electrons for intercepting electrons from said cathode and a second grid electrode positioned between said control grid and said output-screen.

3. In combination in a vacuum-tight container, an electron-emissive cathode, a first planar grid electrode, a planar control grid having apertures closely spaced over its face, a conductive rim for each of said apertures in said control grid, a resistive element and a photoconductive element provided on said control grid for each of said conductive rims, a first conductive means connected through each of said resistance elements to each of said conductive rims, a second conductive means connected through each of said photoconductive elements to each of said conductive rims, and a planar output-screen comprising a material which emits radiation when struck by electrons.

4. In combination in a vacuum-tight container, an electron-emissive cathode, a first grid electrode, a control-grid having apertures closely spaced over its face, and positioned in parallel rows, a conductive rim for each of said apertures, a resistance element and a photoconductive element provided for each of said conductive rims, a first and a second set of conductors respectively connected through said resistance elements and said photoconductive elements to each of said rims, and an output-screen comprising a material which emits radiation when struck by an electron.

5. In combination in a vacuum-tight container, an electron-emissive cathode, a first grid electrode, a control-grid having apertures closely spaced over its face, a conductive rim for each said aperture, a resistance element and a photoconductive element provided for each of said conductive rims, said photoconductive element comprised of the material thallous sulphide, a first and a second set of conductors respectively connected through each of said resistance elements and each of said photoconductive elements to each of said conductive rims, and an output-screen comprising a material which emits radiation when struck by an electron.

6. In combination in a vacuum-tight container a planar electron-emissive cathode, a planar control grid having apertures closely spaced over its face, a conductive rim provided for each of said apertures in said control grid, a resistance element and a photoconductive element connected to and associated with each of said conductive rims, a first conductive means connected to each said resistance elements, a second conductive means connected to each of said photoconductive elements, and an output-screen comprising a material which is sensitive to electron bombardment.

7. A device for producing replicas of a radiation field comprising an electron-emissive cathode, a control grid having apertures closely spaced over its face, means comprising a plurality of photoconductive elements positioned on said control grid having a photoconductive element associated with each of said apertures to vary the potential of each of said apertures in accordance with the intensity of said radiation field incident thereon, and means responsive to the flow of electrons from said cathode through said apertures in said control grid.

8. A device for producing replicas of a radiation field comprising an electron-emissive cathode, a control grid having apertures closely spaced over its face, means comprising a plurality of photoconductive elements positioned on said control grid having a photoconductive element associated with each of said apertures to vary the potential of each of said apertures in accordance with the intensity of said radiation field incident thereon, and means responsive to the flow of electrons comprising a material which emits radiation when struck by electrons.

9. A device for producing replicas of a radiation field comprising an electron-emissive cathode, a control grid having apertures closely spaced over its face, means comprising a plurality of photoconductive elements positioned on said control grid having a photoconductive element associated with each of said apertures to vary the potential of each of said apertures in accordance with the intensity of said radiation field incident thereon, a grid electrode positioned between said control grid and said cathode and means responsive to the flow of electrons from said cathode through said apertures in said control grid.

10. A device for producing replicas of a radiation field comprising a planar electron-emissive cathode, a planar control grid having apertures closely spaced over its face, means comprising a plurality of photoconductive elements positioned on said control grid having a photoconductive element associated with each of said apertures to vary the potential of each of said apertures in accordance with the intensity of said radiation field incident thereon, a planar grid electrode positioned between said control grid and said cathode and a planar output-screen responsive to the flow of electrons from said cathode through said apertures in said control grid.

11. A device for producing replicas of a radiation field comprising an electron-emissive cathode, a first grid electrode, a control grid having apertures closely spaced over its face, and an output screen in the order named, said control grid having a conductive rim for each of said apertures, a resistance element and an element of a material whose conductivity varies in response to incidence of said radiation provided on said control grid and for each of said conductive rims, and a first and second set of conductors respectively connected through said resistance elements and said elements of material whose conductivity varies in response to radiation to each of said conductive rims.

References Cited in the file of this patent

UNITED STATES PATENTS

| | | |
|---|---|---|
| 2,416,720 | Teal | Mar. 4, 1947 |
| 2,572,497 | Law | Oct. 23, 1951 |

FOREIGN PATENTS

| | | |
|---|---|---|
| 682,318 | Great Britain | Nov. 5, 1952 |